July 9, 1940.    R. BOGGS    2,207,653
LAWN RAKE
Filed Dec. 13, 1938
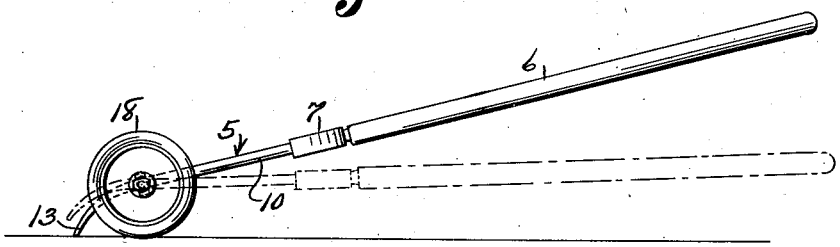
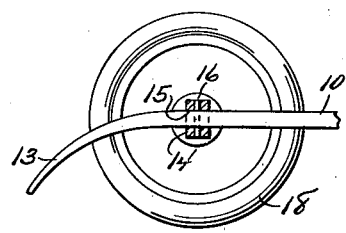
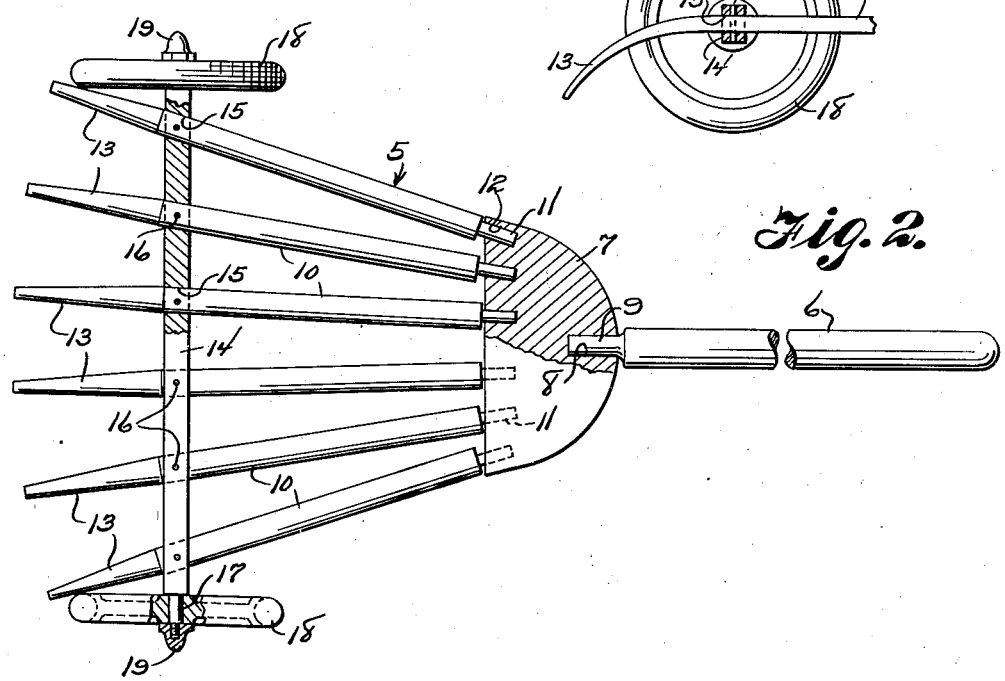
Rosemary Boggs
INVENTOR
BY Victor J. Evans & Co.
ATTORNEYS Patented July 9, 1940

2,207,653

UNITED STATES PATENT OFFICE 2,207,653

LAWN RAKE

Rosemary Boggs, Columbus, Ohio

Application December 13, 1938, Serial No. 245,513

2 Claims. (Cl. 56—400.14)

The present invention relates to new and improved lawn rakes.

The primary object of the invention is to provide a rake embodying means for facilitating operation thereof in that it is not necessary to lift the rake during either the forward or backward raking motion.

Another object of the invention is to provide a lawn rake in which the teeth thereof are associated with an axle in a manner to permit raising and lowering the pointed ends of the teeth by a rocking motion to engage and disengage said teeth from contact with the ground.

The invention will be fully and comprehensively understood from a consideration of the following detailed description when read in connection with the accompanying drawing which forms a part of the application.

In the drawing:

Figure 1 is a side elevational view of the new and improved lawn rake;

Figure 2 is a top plan view thereof with parts in section for illustrative purposes; and Figure 3 is a partial sectional view illustrating the manner of associating the raking teeth with the axle.

Referring to the drawing for a more detailed description thereof, wherein there is illustrated the preferred embodiment of the invention, the new and improved rake indicated generally by the reference numeral 5 includes a handle 6 and header 7, said header being substantially semi-cylindrical shaped and having a socket 8 in the central portion thereof for frictionally receiving the reduced end 9 of the handle 6.

A series of teeth 10 are carried by the header 7, each of the teeth being formed with a reduced end 11 frictionally held in spaced recesses 12 formed in the header as clearly shown in Figure 2 of the drawing.

The free ends of the teeth 10 are disposed in a fan-shaped relation and the ends 13 thereof curve downwardly for contacting the ground when in use. An axle 14 is provided having a series of apertures 15 extending transversely therethrough for receiving and holding the free ends of the teeth 10, with the curved ends of said teeth extending beyond said axle. The teeth are held within the transverse recesses by means of pins or the like 16 which extend through the axle and its associated tooth disposed within the recess.

Each end of the axle 14 is reduced as indicated at 17 forming a bearing for supporting a wheel or the like 18, said wheel being rotatably held on the end 17 by means of the cap 19.

It is to be understood that the rake 5 can be freely moved by pulling forwardly on the handle 6 or pushing the same which causes rotation of the wheels 18 on the axle 14. Maintaining the handle 6 in the angular position illustrated in full lines in Figure 1 of the drawing will cause the pointed ends of the teeth 13 to contact the ground while permitting free rotation of the wheels 18. Pulling forward on the handle 6 the rake will function in the conventional manner and since the teeth are prevented from digging into the ground there is very little possibility of uprooting grass and thereby killing the same. When desiring to move the rake backward, it is merely necessary to lower the handle 6 to the dotted line position illustrated in Figure 1 of the drawing which will raise the pointed end of the teeth from contact with the ground, thereby permitting free and unobstructed rotation of the wheels 18. In other words, raising and lowering the handle 6 will cause engagement and disengagement of the teeth from contact with the ground. The wheels 18 are preferably of a size to permit the ends 13 of the teeth to barely contact the ground for proper raking motion. By the construction of the header 7 and the axle 14, the teeth 10 are firmly and rigidly supported for durable and efficient service.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. A lawn rake comprising, a handle, a semi-cylindrical-shaped tooth header secured to the lower end of said handle, an axle having a plurality of spaced apertures extending transversely therethrough, a plurality of teeth mounted in closely spaced relation in said header and extending fan-shaped through the apertures in said axle and beyond the same, and supporting rollers carried on each end of said axle.

2. A lawn rake comprising, a handle, a tooth header secured to the lower end of said handle, an axle having a plurality of spaced apertures extending transversely therethrough, a plurality of teeth mounted in closely spaced relation in said header and extending through the apertures in said axle and beyond the same, the extending ends of said teeth curving downwardly to form ground engaging portions, and supporting rollers carried on each end of said axle.

ROSEMARY BOGGS.